United States Patent
John et al.

(10) Patent No.: US 12,007,492 B2
(45) Date of Patent: Jun. 11, 2024

(54) APPARATUS, METHOD AND COMPUTER PROGRAM FOR PROCESSING A VOICE RADIO SIGNAL

(71) Applicant: Fraunhofer-Gesellschaft zur Förderung der angewandten Forschung e.V., Munich (DE)

(72) Inventors: Ole John, Hamburg (DE); Ivan Zverev, Weilheim (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 454 days.

(21) Appl. No.: 17/338,966

(22) Filed: Jun. 4, 2021

(65) Prior Publication Data

US 2021/0295840 A1 Sep. 23, 2021

Related U.S. Application Data

(63) Continuation of application No. PCT/EP2019/081751, filed on Nov. 19, 2019.

(30) Foreign Application Priority Data

Dec. 7, 2018 (EP) .................................. 18211076

(51) Int. Cl.
*G01S 3/04* (2006.01)
*G01S 3/14* (2006.01)
(Continued)

(52) U.S. Cl.
CPC ................ *G01S 3/043* (2013.01); *G01S 3/14* (2013.01); *G10L 15/02* (2013.01); *G10L 15/16* (2013.01);
(Continued)

(58) Field of Classification Search
CPC ......... G10L 15/22; G10L 15/02; G10L 15/16; G01S 3/043; G01S 3/14; G01S 19/42; G01S 19/52; G01S 19/53
See application file for complete search history.

(56) References Cited

U.S. PATENT DOCUMENTS

| | | | |
|---|---|---|---|
| 3,824,596 A | 7/1974 | Guion et al. | |
| 6,044,322 A | 3/2000 | Stieler | |

(Continued)

FOREIGN PATENT DOCUMENTS

| | | |
|---|---|---|
| CN | 101527085 A | 9/2009 |
| CN | 105933026 A | 9/2016 |

(Continued)

OTHER PUBLICATIONS

Notice of Allowance dated Jan. 29, 2023 issued in the parallel Chinese patent application No. 201980091650.2 with English translation (4 pages).

(Continued)

*Primary Examiner* — Cassi J Galt
(74) *Attorney, Agent, or Firm* — Haynes and Boone, LLP

(57) ABSTRACT

Apparatus for processing a voice radio signal with a transcription unit configured to convert the voice radio signal into a text signal; an object determination unit configured to determine an object from which the voice radio signal originates; an object localization unit configured to determine position information of the object from which the voice radio signal originates; and an output unit configured to allocate the text signal to the object and to provide the same. The object determination unit is configured to determine a detection probability for at least one object whose position at least partly matches the determined position information. The object determination unit is configured to determine the object with the highest detection probability as the object from which the voice radio signal originates, or, (Continued)

with a very similar detection probability, to determine all objects with the similar detection probability as the object.

13 Claims, 6 Drawing Sheets

(51) Int. Cl.
  *G01S 19/42* (2010.01)
  *G01S 19/52* (2010.01)
  *G01S 19/53* (2010.01)
  *G10L 15/02* (2006.01)
  *G10L 15/16* (2006.01)
  *G10L 15/22* (2006.01)
(52) U.S. Cl.
  CPC .............. *G10L 15/22* (2013.01); *G01S 19/42* (2013.01); *G01S 19/52* (2013.01); *G01S 19/53* (2013.01)

(56) References Cited

U.S. PATENT DOCUMENTS

| | | | |
|---|---|---|---|
| 9,508,262 B2* | 11/2016 | Kar | ......................... G10L 15/26 |
| 2010/0029305 A1 | 2/2010 | Gupta | |
| 2010/0222079 A1 | 9/2010 | Lee | |
| 2013/0346081 A1 | 12/2013 | Loubiere et al. | |
| 2016/0035226 A1 | 2/2016 | Kejik et al. | |
| 2016/0202950 A1 | 7/2016 | Hawley | |
| 2018/0174588 A1 | 6/2018 | Agarwal et al. | |
| 2018/0307462 A1* | 10/2018 | Choi | ....................... G06F 3/167 |

FOREIGN PATENT DOCUMENTS

| | | |
|---|---|---|
| DE | 19619015 | 11/1997 |
| EP | 3203458 | 8/2017 |
| FR | 3056321 A1 | 3/2018 |
| JP | H08305997 A | 11/1996 |
| JP | 2002048572 A | 2/2002 |
| WO | WO 2016037204 A1 | 3/2016 |

OTHER PUBLICATIONS

International Search Report and Written Opinion dated Feb. 19, 2020 issued in PCT Patent App. No. PCT/EP2019/081751 (13 pages with English Translation).
International Preliminary Examination Report dated Mar. 25, 2021 issued in PCT Patent App. No. PCT/EP2019/081751 (5 pages).
Office Action dated Jul. 4, 2022 issued in the parallel Chinese patent application No. 201980091650.2 (10 pages).
Office Action dated Jul. 4, 2022 issued in the parallel Chinese patent application No. 201980091650.2 with English translation (24 pages).
Office Action dated Jul. 11, 2022 issued in the parallel Japanese patent application No. 2021-532425 (8 pages).
Notice of Allowance dated Oct. 11, 2023 based on Korean patent application No. 10-2021-7021332.

* cited by examiner

1

APPARATUS, METHOD AND COMPUTER PROGRAM FOR PROCESSING A VOICE RADIO SIGNAL

CROSS-REFERENCE TO RELATED APPLICATIONS

This application is a continuation of copending International Application No. PCT/EP2019/081751, filed Nov. 19, 2019, which is incorporated herein by reference in its entirety, and additionally claims priority from European Application No. EP 18211076.7, filed Dec. 7, 2018, which is also incorporated herein by reference in its entirety.

Embodiments according to the invention relate to an apparatus, a method and a computer program for processing a voice radio signal.

BACKGROUND OF THE INVENTION

In the maritime sector, in the aviation sector as well as in the land-based sector, currently, no technical solution exists that allows tracing of spoken radio (e.g., the VHF marine radio, aviation radio, VHF land radio, etc.) in connection with transmitter identification. Currently, a system combining the technologies for speech recognition, evaluation of transmitter information data (such as AIS data (shipping) or ADS-B data (aviation)) and radial direction finding is not known.

Nowadays, many versions of radio devices have recording functions storing received voice radio signals for a defined time period in order to be able to replay the same afterwards (last call voice recording). Thus, nowadays, only fragmentary sections of communication histories can be replayed as audio recording for a short time period. Further, recognizing the senders of radio messages or the allocation of the received communication to radio stations located in the receiving area (e.g., ships, airplanes, land vehicles, etc.) is not given. Senders of radio messages can only be determined indirectly by means of existing information systems (such as AIS, ADS-B, GPS data, etc.).

Considering this, there is a need for a concept allowing improved intelligibility of a received voice radio signal, traceability of past and possibly missed voice radio signals by history documentation of the same as well as localization and identification of the sender.

SUMMARY

According to an embodiment, an apparatus for processing a voice radio signal may have: a transcription unit configured to convert the voice radio signal into a text signal; an object determination unit configured to determine an object from which the voice radio signal originates; an object localization unit configured to determine position information of the object from which the voice radio signal originates, wherein the object localization unit includes at least one radio direction finder; an output unit configured to allocate the text signal to the object and to provide the same; and wherein the object determination unit is configured to determine a detection probability for at least one object whose position at least partly matches the determined position information, wherein the detection probability defines a degree of correspondence of the position information, determined by means of the object localization unit, with the actual position of an object, and wherein the object determination unit is configured, with a very similar detection probability, to determine all objects with the similar detection probability as the object, wherein the output unit is configured in this case to allocate all these objects with the similar detection probability to the text signal and to also state the detection probability, respectively.

According to another embodiment, a method for processing a voice radio signal may have the steps of: converting the voice radio signal into a text signal by means of a transcription unit; determining an object from which the voice radio signal originates by means of an object determination unit; determining position information of the object from which the voice radio signal originates by means of an object localization unit, wherein the object localization unit includes at least one radio direction finder; and allocating the text signal to the object and providing the text signal allocated to the object by means of an output unit; wherein determining the object includes determining a detection probability for at least one object whose position at least partly matches the determined position information and with a very similar detection probability, determining all objects with the highest detection probability as the object from which the voice radio signal originates, wherein the detection probability defines a degree of correspondence of the position information, determined by means of the object localization unit, with the actual position of an object, and wherein in this case of very similar detection probabilities all these objects with the similar detection probability are allocated to the text signal and the detection probability is also stated, respectively.

Another embodiment may have a non-transitory digital storage medium having a computer program stored thereon to perform the inventive method for processing a voice radio signal, when said computer program is run by a computer.

An embodiment relates to an apparatus for processing a voice radio signal comprising a transcription unit configured to convert the voice radio signal into a text signal. Further, the apparatus comprises an object determination unit configured to determine an object from which the voice radio signal originates. Further, the apparatus comprises an object localization unit configured to determine position information of the object from which the voice radio signal originates; and an output unit configured to allocate the text signal to the object and to provide the same. A voice radio signal can be a voice message transmitted by a radio signal transmitter to a radio signal receiver, wherein the object can comprise both a radio signal transmitter as well as a radio signal receiver. The text signal, determined by means of the transcription unit, can represent the voice radio signal as a message in text form (e.g., ASCII).

This embodiment of the apparatus is based on the finding that communication via radio is easy to trace when the voice radio signal is converted into a text signal by means of the transcription unit since information of the radio communication can be determined in the text signal at any time and hence faulty memories of the voice radio communication can be prevented. Further, allocating position information and/or object identification information of the object to the text signal allows identification or localization of a sender of the voice radio signal and hence the radio communication can be documented very accurately and well. In particular, for example, in rescue operations at land, in the air or in the maritime area, it is advantageous to be able to trace the radio communication during an operation as well as after an operation and to allocate the same to individual objects, such as ships, airplanes or land vehicles. Every object that can emit a voice radio signal can also comprise an apparatus described herein. Thus, the apparatus can allow that each object participating in the radio communication can trace, by means of the apparatus, when and where which object has communicated a text signal documented by the apparatus as voice radio signal.

Thus, it has to be stated that the apparatus is configured to make voice radio signals intelligible by converting the same into text signals, to read or research content from the voice radio signals by means of the text signal and to identify and localize the sender of the voice radio signal.

According to an embodiment, the object localization unit is configured to determine an area where the object is located with a probability as position information. The object localization can comprise at least one localization apparatus or is configured to communicate with the at least one localization apparatus to determine a source of the voice radio signal as the area. The area is, for example, an area having an extension in one dimension (e.g., a line (e.g., signal-beam) indicating the direction of the incoming voice radio signal), in two dimensions (an area of any form, such as a circular area, a circular sector, a triangle, a rectangle, a polygon, etc.) or an extension in three dimensions (e.g., body of any shape, such as spherical area, conical area, cuboid area, etc.). The area defines, for example, a direction from which the voice radio signal originates, from which the object localization unit can conclude that the object is arranged in this area. Here, the object localization unit can determine a probability with which the object is arranged in the area, wherein the probability can indicate how exactly the at least one localization apparatus can determine the area. Thus, coarse localization becomes already possible, whereby the apparatus can be used, for example, for rescue operations, as the object that has emitted an emergency radio signal can be localized by means of the object localization unit even with poor voice intelligibility (e.g., the position of the object is e.g., unintelligible or is not communicated) in order to send rescue forces in the direction of the object (e.g., the area).

According to an embodiment, the localization apparatus comprises at least one radio direction finder. By means of the at least one radio direction finder, the object localization apparatus can limit a source of the voice radio signal to the area. In other words, the area can comprise the source of the voice radio signal. If, for example, several radio direction finders are used, the area can be decreased and/or the probability can be increased or an exact position of the object can be determined by means of the object localization unit.

According to an embodiment, the object localization unit is further configured to receive position data (e.g., GPS positions, courses, routes, speeds, etc.) of objects. Here, for example, not the voice radio signal is localized but an object arranged within a radius (e.g., up to a maximum distance from the apparatus of 20 km, 50 km, 100 km or 1000 km) of the apparatus. This allows the determination of position information of potential objects from which the voice radio signal can originate. Optionally, the object localization unit is configured to receive position data (e.g., GPS positions, courses, routes, speeds, etc.) of objects in the area (from which the voice radio signal originates). This does not only allow the determination of an area from which the voice radio signal originates (for example by means of the localization apparatus) but additionally the determination of very exact position data of objects that have possibly emitted the voice radio signal. Thus, localization (or object determination by means of the object determination unit) of the object that has emitted the voice radio signal is not limited to the entire area but to individual positions within the area. This allows optimized localization and allocation of the voice radio signal to an object.

According to an embodiment, the object localization unit can comprise an AIS receiver, an ADS-B receiver, a radar unit and/or general position data receiver or can communicate with the same in order to receive the position data. The position data can comprise a GPS position, a route, a speed and/or an altitude relative to sea level. Here, depending on the object, the position data can be received by a different receiver. Thus, for example, the AIS receiver can receive the position data of ships, the ADS-B receiver the position data of airplanes, the radar unit the position data of metallic objects, such as ships, airplanes, vehicles, etc., and the general position data receiver the position data of a plurality of possible objects, such as land vehicles. This allows multiple use of the apparatus for processing a voice radio signal, both on land, in water as well as in the air. The specific combination of receivers for receiving position data of objects and radio position finders determining an area from which the voice radio signal originates with a probability in the object localization unit allow the determination of an object from which the voice radio signal originates in a very fast and accurate manner. Thus, a voice radio signal can be very efficiently allocated to an object and its position.

According to an embodiment, the object determination unit can comprise an AIS receiver, an ADS-B receiver and/or a general object identification receiver or can communicate with the same to obtain object identification data of at least one object whose position at least partly matches the position information determined by the object localization unit. This match can mean, e.g., that the object determination unit compares the position data of objects with the area comprising the source of the voice radio signal and receives the object identification data only of objects in the area. Thus, the object determination unit is configured, for example, to allocate object identification data, such as a call number of the maritime mobile service (MMSI), an object name, a target of the object, a load of the object and/or a size of the object to an object localized by the object localization unit. Thereby, the voice radio signal can be allocated, by means of the apparatus, not only to position information, e.g., localization of the voice radio signal, but additionally to the object from which the voice radio signal originates. Here, the object determination unit is configured to obtain, for example, via the AIS receiver, object identification data of ships, via the ADS-B receiver, object identification data of airplanes and/or via the general object identification receiver of other objects, such as land vehicles, object identification data of at least one object. Here, the position information determined by the object localization unit can represent, for example, an exact GPS position, whereby the object determination unit obtains, for example, the object identification data only from an object whose position exactly matches the determined position information. When the position information determined by the object localization unit defines, for example, an area, the object determination unit can obtain object identification data from several objects whose position is within the area.

According to an embodiment, the object identification data can comprise a call number of the maritime mobile service (MMSI), an object name, a target of the object, a load of the object and/or a size of the object. Thus, by allocating the call number of the maritime mobile service, a user of the apparatus can very easily contact, for example, the object from which the voice radio signal originates. Further, in a radio communication of several objects, by allocating the object name to the respective voice radio signal, different voice radio signals can be allocated to individual objects via the object name in order to improve the traceability of the radio communication. The target of the object, the load of the object and/or the size of the object can represent further important object identification data, which can represent, together with the voice radio signal, very detailed information to be processed efficiently in a radio communication. Here, it is particularly advantageous that the apparatus is configured to provide the voice radio signal in the form of a text signal together with the object identification data (for example via the output unit).

According to an embodiment, the object determination unit is configured to determine a detection probability for at least one object whose position at least partly matches the determined position information. Further, the object determination unit is configured, for example, to determine the object with the highest detection probability as the object from which the voice radio signal originates. The detection probability defines, for example, a probability according to which the voice radio signal originates from the object. The detection probability allows, for example, the object determination unit to allocate a single object to the voice radio signal or the corresponding text signal when the object determination unit identifies, for example, several objects whose position at least partly matches the position information determined by the object localization unit. Thus, the apparatus can unambiguously allocate an object to the voice radio signal or the text signal.

According to an embodiment, with a very similar detection probability (e.g., a deviation by ±1%, ±2% or ±5%), the object determination unit can be configured to determine all objects having the similar detection probability as the object and the output unit can, for example, be configured to allocate all these objects to the text signal in that case and to also indicate the respective detection probability. Optionally, in that case, the apparatus can be configured to analyze at least two voice radio signals from the same object that follow each other in quick succession (e.g., within a maximum of 5 minutes, within a maximum of 30 minutes, within a maximum of 1 hour or within a maximum of 5 hours) in order to increase the detection probability. The position of the object can have changed between the at least two voice radio signals and this change of position can be compared, for example, by means of the object determination unit to a course or route of objects whose position at least partly matches the position information. According to an embodiment, the apparatus can be configured to determine by means of speech pattern codes whether the at least two voice radio signals that follow each other in quick succession originate from the same object.

According to an embodiment, the detection probability defines a degree of correspondence of the determined position information with an actual position of an object, wherein the determined position information represents the position information determined by means of the object localization unit. Additionally or alternatively, the object determination unit can determine the detection probability based on probabilities of correct position information of the object localization unit. The determined position information can represent, for example, an area that has been determined by the object localization unit, for example, by means of a radio direction finder and the actual position of the object can be arranged, for example, at the edge of the area or in a center of the area or only partly overlap with the area, which results in a differing degree of correspondence that defines the detection probability. Thus, for example, objects close to a center of the area can have a higher detection probability than objects at an edge of the area. The additional usage of the probabilities of the correct position information determined by means of the object localization unit additionally or alternatively allows the incorporation of possible inaccuracies of the apparatus and hence very accurate identification of objects. Here, the probability of correct position information can correspond, for example, to a probability allocated to the area by the object localization unit, which indicates with what probability the object is arranged in the area determined by the object localization unit.

According to an embodiment, the object determination unit is configured to communicate with the transcription unit to determine an object identification of the object from the text signal. Thus, for example, the voice radio signal can already comprise an object identification (in that way, the radio operator emitting the voice radio signal can state his name and/or a name or identification of the object from which the voice radio signal is emitted), which can be transcribed by means of the transcription unit and can be determined by means of the object determination unit from the transcribed text signal. This allows determination of the object with, for example, 100 percent or very high detection probability by the object determination unit without having to compare positions of objects with position information determined by the object localization unit. Optionally, for verification, the comparison can still be made.

According to an embodiment, the transcription unit is configured to extract a speech pattern code from the voice radio signal and to provide the same to the object determination unit. Further, the object determination unit can be configured to determine the object from which the voice radio signal originates based on the speech pattern code. The speech pattern code can be allocated, for example, to a radio operator who can be allocated to an object. According to an embodiment, the apparatus can comprise a database or can be configured to access the database, wherein the database can comprise speech pattern codes allocated to radio operators or objects. Alternatively, it is also possible that the apparatus extracts the speech pattern code from a first voice radio signal and determines the allocated object by means of the object determination unit and then caches the speech pattern code with the object to detect the speech pattern code in a subsequent second voice radio signal and not having to determine the object again by means of the object determination unit but to determine the allocated object identification information directly from the cached speech pattern code. In other words, the object determination unit can be configured to determine the object identification data of the object first independent of the determined speech pattern code and to determine the object identification data of the object based on the speech pattern code in a second voice radio signal having the same speech pattern code.

According to an embodiment, the transcription unit is configured to use a neuronal network to convert the voice radio signal into a text signal. This allows, for example, that the transcription unit detects frequently used phrases in the voice radio signals by means of the neuronal network and hence a very efficient fast and easy conversion of the voice radio signal into the text signal is enabled.

According to an embodiment, the apparatus is configured to process at least two voice radio signals simultaneously and/or offset in time. Further, the output unit can be configured to allocate the at least two text signals to the at least two voice radio signals to the respective object and to provide the same chronologically to the apparatus via a user interface and/or to store the same in a database. This allows tracing of a radio communication course with several voice radio signals or the research of earlier voice radio signals and allocating the same to the respective object. Thereby, the apparatus can be configured to document and provide a documentation of a radio communication with several voice radio signals.

According to an embodiment, the output unit is configured to provide both the text signal, an allocated object, a position of the object as well as an input time or the voice radio signal to the apparatus via a user interface and/or to store the same in database. Here, for example, the output unit can be configured, for example, to provide the text signal with the allocated object in the position as text data or to store the same, wherein, for example, the data can be indicated on the user interface such as in a chat history. Further, it is also possible that card material such as of land, water or air is shown on the user interface and the object is indicated at the position determined by the object localization unit with the text signal. Thus, on the user interface by means of the output unit, for example, the text signal can be illustrated with the allocated object. Both the user interface as well as the database enable quick access to the data determined by means of the apparatus.

According to an embodiment, the object is a ship, an airplane or a vehicle.

An embodiment provides a method for processing a voice radio signal, wherein the method comprises converting the voice radio signal into a text signal by means of a transcription unit, determining an object from which the voice radio signal originates by means of an object determination unit, determining position information of the object from which the voice radio signal originates by means of an object localization unit and allocating the text signal to the object and providing the text signal allocated to the object by means of an output unit.

An embodiment provides a computer program with a program code for performing the method described herein when the program runs on a computer.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be discussed in more detail below with reference to the drawings, it should be noted that identical, functionally equal or equal elements, objects and/or structures are provided with the same or similar reference numbers in the different figures so that the description of these elements illustrated in the different embodiments is inter-exchangeable or inter-applicable.

Figure 1:
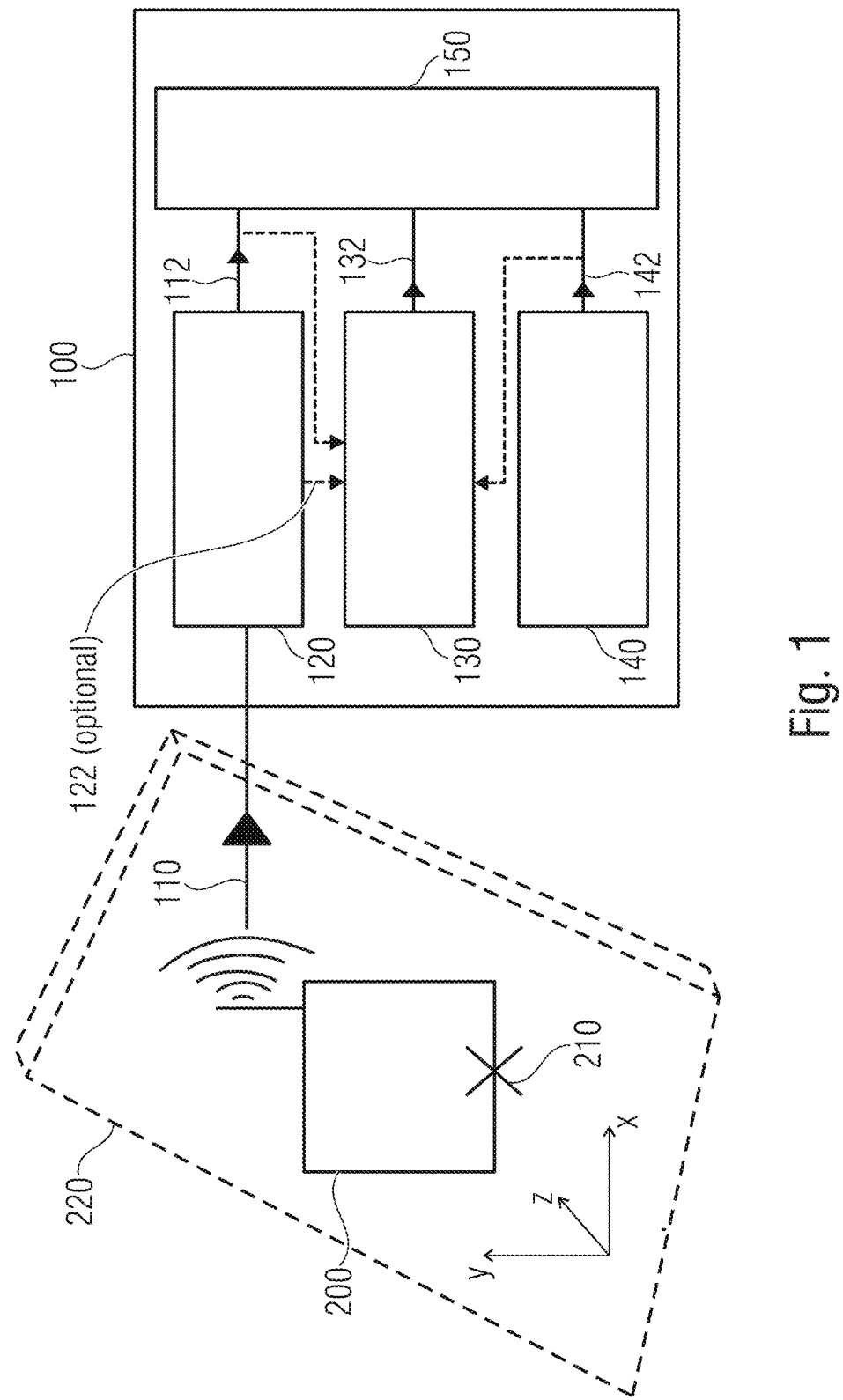
FIG. 1 is a schematic illustration of an apparatus according to an embodiment of the present invention.

FIG. 1 shows a schematic illustration of an apparatus 100 for processing a voice radio signal 110. The apparatus 100 comprises a transcription unit 120 configured to convert the voice radio signal 110 into a text signal 112. Further, the apparatus 100 comprises an object determination unit 130 configured to determine an object 200 from which the voice radio signal 110 originates. Additionally, the apparatus 100 comprises an object localization unit 140 configured to determine position information 142 of the object 200 from which the voice radio signal 110 originates and the apparatus 100 further comprises an output unit 150 configured to allocate the text signal 112 to the object 200 and to provide the same.

According to an embodiment, the object localization unit 140 can be configured to determine an area 220 as position information 142 where the object 200 is allocated with a probability, wherein the probability can indicate an accuracy of the object localization unit 140 in determining the position information. According to FIG. 1, the area 220 can have a three-dimensional extension. However, it is also possible that the area 220 has a two-dimensional (e.g., an area) or a one-dimensional (e.g., a signal-beam) extension. For determining the position information 142, the object localization unit 140 can comprise at least one localization apparatus or can be configured to communicate with the at least one localization apparatus to determine the area 220 comprising the source of the voice radio signal or to determine an exact position 210 of the object.

According to an embodiment, the localization apparatus can include at least one radio direction finder. Here, it should be noted that the object localization unit 140 can be configured to determine an area 220 as position information 142 when the object localization unit 140 comprises only one radio direction finder or is configured to communicate with only one radio direction finder. If the object localization unit 140 comprises at least two radio direction finders or is configured to communicate with at least two radio direction finders, by considering the system inaccuracies, high approximation to the exact position 210 can be determined, as triangulation is possible in this case.

According to an embodiment, the object localization unit 140 can further be configured to receive position data, e.g., the exact object position 210, from objects 200 in the area 220. Thus, the apparatus 100 can be configured to determine the area 220 at first and to subsequently determine position data 210 of objects 200 in the area and to determine or to provide the position data 210 as position information 142 instead of the area 220.

According to an embodiment, the object localization unit 140 can be configured to detect whether an area or exact position of the object 200 can be determined with the radio direction finder, and to decide thereupon whether position data 210 of objects 200 are to be detected in the area 220. Here, the object localization unit 140 can be configured to receive position data 210 when only one area is determined with the one or several radio direction finders or can decide to receive no position data 210 when the object localization unit 140 can determine the position data 210 already by means of the several radio direction finders.

According to an embodiment, the object localization unit 140 can comprise an AES receiver, an ADS-B receiver, a radar unit and/or a general position data receiver or can be configured to communicate with the same to receive the position data 210. As illustrated in FIG. 1, the position data 210 can comprise, for example, a GPS position and additionally or alternatively a route, a speed and/or an altitude relative to sea level. Here, the list of possible position data receivers and position data 210 is to be considered as exemplary and not as limiting.

In the following, features and functionalities of the object localization unit 140 will be discussed in other words, wherein in particular ships and airplanes will be dealt with as objects 200 to be localized.

Locating ships as well as locating airplanes can take place by means of the object localization unit 140 with different technologies. AIS technology (locating ships), ADS-B technology (aircrafts), radar devices and radio direction finders are suitable systems.

AIS stands for Automatic Identification System (ETSI EN 303 098-1, 2013-05, p. 9). Generally, the AIS system allows, e.g., monitoring of maritime traffic and serves to prevent collision between ships. The functional basis of the system is the equipment of ships with an AIS transponder in combination with an electronic nautical chart (ECDIS). In a time division multiple access method (TDMA), the transponder emits data, e.g., on the frequencies (161.975 MHz and 162.025 MHz) (ITU Radio communication Bureau, p. 1 and p. 67) that can be received from other ships (also by AIS transponder) or land stations. The data includes, e.g., information such as ship identification, current GPS position, course, speed and other ship-related data. This data can be shown, for example, on an electronic nautical chart. When the ships are equipped with AIS, they are accordingly visible for others and can be seen by others. The object localization unit 140 is configured to receive, e.g., these data and to process the same for determining the position information 142.

ADS-B stands for Automatic Dependent Surveillance Broadcast (see specifications in Specification in EUROCAE ED 129 "TECHNICAL SPECIFICATION FOR A 1090 MHZ EXTENDED SQUITTER ADS-B GROUND SYSTEM") and allows, similar to the AIS system in the maritime field, obtaining information on aircrafts within the range of the ADS-B receiver. When aircrafts are equipped with ADS-B transponders, they transmit, e.g., on 1090 MHz their identification, course, speeds, current position and other data. Thereby, aircrafts become visible for other aircrafts and air traffic controllers. The object localization unit 140 is configured to receive and process, e.g., these data to determine the position information 142.

In contrary to AIS systems and ADS-B systems, radar units are not dependent on the mutual exchange of data. The basis of radar locating is the reflectivity of electrically conductive surfaces. Most ships, airplanes and land vehicles (examples for objects 200) have a metallic body reflecting an incident electromagnetic wave. Accordingly, radars can emit a high-frequency transmission pulse and can subsequently receive the echo. As the propagation speed of radio waves is known (speed of light), the distance from the radar station to the ship can be determined from the time measurement between the transmission pulse and the echo. To determine a relative angle of the echo signal, mostly, mechanically rotating antennas are used that emit high-frequency pulses in all directions and receive the echoes from the same directions.

Both AIS systems as well as radar systems allow a chart display of several ships within respective range of the units. In the context of communication safety, AIS, ADS-B and radar locating merely determine the amount of potential communication participants.

Radio direction finding systems measure the angle of incidence of an electromagnetic wave on the direction finding antenna and thereby enable determining the direction from which the radio signal originates. Basically, a direction finding system "analyses" the electromagnetic wave field surrounding the direction finding antenna mostly consisting of several dipole elements. For this, different direction finding methods exist. Interferometers and Doppler systems are commonly used. The interferometer principle uses the direct measurement of the phase difference between the individual elements of the direction finding antenna. Knowing the distances between antenna elements and speed of light allows calculation of the bearing angle by geometrical approaches. Interferometer direction finders usually need one receiver per antenna element. Compared to Doppler systems, such systems allow direction finding of very short radio pulses, which is significant for radio monitoring. In the Doppler principle, the individual antenna radiators of the direction finding antenna are switched (commutated) such that the direction finding antenna finally represents a virtual antenna vibrator moving at constant speed on a circular track in the incident electromagnetic wave. If the same moves towards the wave, the received frequency will increase according to Doppler. The received frequency decreases when the virtual antenna moves away from the wave. This results in frequency modulation at the receiver input, which is demodulated during signal processing and processed to a "direction finding phase signal". If the direction of incidence of the radio signal changes, the phase position of the direction finding phase signal changes accordingly. Determining the bearing angle takes place by measuring the stated phase position. Since both the relative angle as well as the distance to the communication source should be known for locating, locating should not be performed with a single direction finding system. Exact or very exact radio locating can take place by cross bearing. However, this involves a further direction finding system at a clearly distant installation location. For reasons of space, the usage of a radio locating system by cross bearing is almost impossible on a ship or an aircraft. However, in land-based applications such as sea lane control or flight control, several radio direction finding systems at different locations can be used.

According to an embodiment, the object determination unit 130 can also comprise an AIS receiver, an ADS-B receiver and/or a general object identification receiver or can be configured to communicate with the same to obtain object identification data 132 of at least one object 200 whose position 210 at least partly matches the position information 142 determined by the object localization unit 140. Here, it is possible that the object determination unit 130 and the object localization unit 140 share the same AIS receiver, ADS-B receiver, or both the object determination unit 130 as well as the object localization unit 140 are configured to communicate with the same AIS receiver or ADS-B receiver. Further, the object localization unit 140 can be configured to provide the position information 142 to the object determination unit 130 so that the object determination unit 130 can compare the position 210 of the object 200 to the position information 142. Thus, it is possible that the object determination unit 130 determines, for example, only object identification data 132 of objects 200 that at least partly comprise the position information 142, so that it is ensured that the objects 200 have emitted the voice radio signal 110 with high probability.

According to an embodiment, the object identification data 132 comprise a call number of the maritime mobile service (MMSI), an object name, a target of the object, a load of the object and/or a size of the object. Here, the list of object identification data is to be considered as exemplarily and not as limiting.

According to an embodiment, the object determination unit 130 is configured to determine a detection probability for at least one object 200 whose position 210 at least partly matches the determined position information 142. The detection probability can define, for example, with what probability or certainty the determined object 200 has emitted the voice radio signal 110. Further, the object determination unit 130 can be configured to determine the object with the highest detection probability as the object 200 from which the voice radio signal 110 originates. Thus, for example, only data of the object 200 having the highest detection probability are determined as object identification data 132.

According to an embodiment, the detection probability determines a degree of correspondence of the determined position information 142 with an actual position 210 of an object 200. The closer the object 200 is arranged, for example, to the determined position information 142, the higher the detection probability. Additionally or alternatively, the object determination unit 130 can be configured to determine the detection probability based on probabilities of correct position information 142 of the object localization unit 140. Thereby, the object determination unit 130 can incorporate uncertainties or possible errors of the object localization unit 140 in the determination of the object 200.

According to an embodiment, the object determination unit 130 can be configured to communicate with the transcription unit 120 to determine an object identification 132 of the object 200 from the text signal 112.

According to an embodiment, the transcription unit 120 is configured to extract a speech pattern code 122 from the voice radio signal 110 and to provide the same to the object determination unit 130, wherein the object determination unit 130 can be configured to determine the object 200 from which the voice radio signal 110 originates based on the speech pattern code 122. Here, the object determination unit 130 can relate speech pattern codes 122, for example, of persons on board of a ship, an airplane or a land vehicle to the respective object (e.g., the ship, the airplane or the land vehicle) and thereby determine the object. According to an embodiment, the object determination unit 130 can provide the object determined in that manner as object identification data 132.

According to an embodiment, the transcription unit 120 can be configured to use a neuronal network to convert the voice radio signal 110 into a text signal 112. Thus, the apparatus 100 comprises an advantageous transcription unit 120 since radio voice signals 110 can be converted into a text signal 112 very quickly by means of the neuronal network.

According to an embodiment, the transcription unit 120 can comprise an already existing speech processing system for converting a voice message (e.g., the voice radio signal 110) into the text signal 112. Thus, the transcription unit 120 can comprise known speech recognition software, such as described briefly below. For decades, automatic recognition and intelligibility of spoken language by computers has been the subject of intensive research. Automatic speech recognition is a method allowing computers to automatically detect spoken language as data and subsequently make it available for processing. Currently, speech recognition software for speech processing and independent speech recognition is available by several providers and in use.

According to an embodiment, the apparatus 100 is configured to process at least two voice radio signals 110 simultaneously and/or offset in time. Here, the at least two voice radio signals 110 can originate from different objects at different positions. Further, the output unit 150 can be configured to allocate at least two text signals 112 of the at least two voice radio signals 110, determined by means of the transcription unit 110, to the respective object 200 and to provide the same in chronological order via a user interface of the apparatus 100 and/or to store the same in a database. Thus, the apparatus 100 is, for example, configured to document radio communication with the at least two voice radio signals 110 in a traceable manner.

According to an embodiment, the output unit 150 is configured to provide both the text signal 112, an allocated object 200, a position 210 of the object 200 as well as in input time of the voice radio signal 110 via a user interface of the apparatus 100 and/or to store the same in a database. Here, the output unit 150 can receive the text signal 112 from the transcription unit 120, the position of the object from the object localization unit 140 via the position information 142 and can receive the allocated object via the object determination unit 130, for example, by means of the object identification data 132. The output unit 150 can be configured to process the text signal, the allocated object, the position of the object and the input time of the voice radio signal 110 such that a user of the apparatus 100 can trace or research a history of a radio communication very easily and efficiently.

According to an embodiment, the object 200 can be a ship, an airplane or vehicle.

According to an embodiment, the apparatus is configured to comprise at least one of the following three points:
- In speech recognition, the apparatus 100 can comprise a programmed deep neuronal network for maritime speech recognition that has been trained or can be trained by means of the apparatus.
- In ship identification or identification of an airplane or land vehicle, the apparatus 100 can comprise a developed algorithm, e.g., in the object identification unit 130, which identifies and localizes one or several objects based on the input data 112, 122 and/or 142 (see FIG. 2 "system drawing—block diagram").
- Concatenation of speech recognition and object recognition.

The following embodiments will illustrate the context between identification and localization in other words. The same relate to four cases of application:
a. A fully equipped ship
   AIS system and one radio device on board
b. A rudimentarily equipped ship
   Only one radio device
c. A fully equipped aircraft
   ADS-B transponder system and one radio device on board
d. A rudimentarily equipped aircraft
   Only one radio device on board
a. Fully Equipped Ship
AIS system and one radio device are, e.g., on board.
Scenario
A ship's captain reports, e.g., per radio on channel 16. The AIS transponder emits, e.g., continuously, the respective ship information (MMSI, the name of the ship, position, speed, course and other data).
Localization
Localization by radio direction finder:
While the captain talks, the direction of the radio signal is found by the apparatus 100. Here, e.g., the direction of the direction finding station to the ship is determined. In the sense of localization, by knowing the radio direction finding deviations of the direction finding system, e.g., a cone (example for an area 220) becomes known where the ship object 200 is located. The processing algorithm of the apparatus 100 registers this cone as area with increased detection probability. Further, evaluating the radio signal level has an influence on the distribution of the probabilities on a signal-beam (example for an area 220).

If, additionally, direction finding is to be performed from a different location with a further direction finding system, a further "probability cone" will result. Both probability areas are processed by the algorithm, which results in a limited area (e.g., area 220) with increased localization probability (e.g., detection probability). Here, it becomes clear that rudimentary localization can already take place with one direction finding system. Evaluating the radio signal level and using further direction finding systems increases the localization accuracy.

Here, it can already be stated that object localization has taken place. Finally, one zone (e.g., the area 220) from which a radio message has been emitted is known.

Increasing the Localization Accuracy by Evaluating the AIS Data: From the received AIS data, e.g., position data (GPS positions 210, courses, speeds) and identification data (MMSI, name of the ship, port of destination, load, size of the ship, etc.) of the ships within the receiving range of the unit are obtained. By measuring the time between the current time and the times of the AIS messages, the current ship positions can be determined more accurately taking into account the courses of the ships and speeds of the ships.

If one or several ships (object 200) are in the already determined probability zone (example for an area 220, field with GPS positions and allocated detection probabilities), a ship position 210 having the highest probability will be detected as radio signal source. The GPS position, which is obtained from AIS data and corrected, terminates the localization with the maximum possible system accuracy.

Identification

The identification is derived, e.g., from the localization. All relevant identification data, such as MMSI, name of the ship, port of destination, load, size of the ship, etc., are obtained from the allocated AIS message that includes a detected GPS position 210.

Transcription

After receiving a voice signal, for example, transcription takes place locally and automated, by means of the transcription unit 120 based on the voice message transmitted via VHF maritime radio (e.g., voice radio signal 110). For this, for example, a neuronal network is used, which was been developed specifically for detecting standard marine communication phrases. By linking the transcription system 120 to the transmitter localization (e.g., object localization unit 140) and identification (e.g., object determination unit 130) received voice messages can be retrieved in written form (e.g., text signal 112) and can be allocated to the respective localized ships, such that past radio messages (e.g., voice radio signal 110) can be traced via a user interface. If transcribed voice messages (e.g., text signal 112) include errors or non-detected voice messages, subsequent correction is possible via a feedback loop, such that the detection rate of the deep neuronal network can be additionally optimized over time.

b. Rudimentarily Equipped Ship

Only one radio device is, e.g., on board.

Scenario

A ship's captain reports per radio, e.g., on channel 16. As the ship has, e.g., no AIS transponder, the respective ship information (MMSI, name of the ship, position, speed, course and other data) is not emitted.

Localization

Localization by radio direction finding and evaluating the signal strength takes place, for example, in the same way as the localization of a fully equipped ship. As the ship emits no IIS data, there is a probability that the ship object is not within the determined probability zone or the detection probability of other surrounding ships is rated as being too low to determine a unique GPS position. Therefore, localizing ships without AIS transponder is less accurate in comparison. Further, there is even potential of faulty detection when a fully equipped ship whose emitted GPS position is rated as being highly probable is within the determined probability zone.

Identification

In this scenario, identification is, e.g., not necessarily possible in automated manner. It can be assumed that a radio signal originates from a ship not needing to have AIS equipment or where the AIS system is defect or switched off.

Transcription

The transcription functions the same way as the transcription on a fully equipped ship as the transcription operates locally only based on the received VHF radio and is hence independent of the equipment of the ship transmitting the voice messages.

c. Fully Equipped Aircraft

ADS-B transponder system and one radio device are, e.g., on board.

Scenario

A pilot reports per radio, e.g., on the known tower frequency (118-137 MHz). The ADS-B transponder continuously radiates the respective information (identification, position, speed, course and other data).

Localization

Localization by radio direction finder:

While the pilot speaks, direction finding of the radio signal is performed. Here, e.g., the direction from the direction finding station to the aircraft is determined. In the sense of localization, by knowing the direction finding deviations of the direction finding system, e.g., a cone, becomes known within which the aircraft is located. The processing algorithm registers this cone as area with increased (e.g., the voice radio signal 110) (area 220) detection probability. Further, evaluating the radio signal level has an influence on the distribution of the probabilities on the signal-beam (area 220).

If, additionally, direction finding is to be performed from a different location with a further direction finding system, a further "probability cone" will result. Both probability areas are processed, e.g., by the algorithm, which results in a limited area (area 220) with increased localization probability. Here, it becomes clear that rudimentary localization has already been performed with one direction finding system. Evaluating the radio signal level and using further direction finding systems increases the localization accuracy.

Here, it can already be stated that object localization has taken place. Finally, a zone from which a radio message has been emitted is known.

Increasing the localization accuracy by evaluating the ADS-B data:

From the received ADS-B data, position data 210 (GPS positions, courses, speeds) and identification data (identification, aircraft type, etc.) of the aircrafts (object 200) within the receiving range of the unit are obtained. By measuring the time between the current time and the times of the ADS-B messages, the current positions of the aircrafts can be determined more accurately taking into account the courses and speeds.

If one or several aircrafts are within the already determined probability zone (field with GPS positions and allocated detection probabilities), an aircraft position having the highest probability will be detected, e.g., as radio signal source. The GPS position, which is obtained from ADS-B data and corrected, terminates the localization with the maximum possible system accuracy.

Identification

The identification is derived, e.g., from the localization. All relevant identification data, such as identification, aircraft type and other data are obtained, e.g., from the allocated ADS-B message that includes a detected GPS position.

d. Rudimentarily Equipped Aircraft (e.g., UL-Ultralight)

Only one radio device is, e.g., on board.

Scenario

One pilot reports per radio, e.g., on the known tower frequency (118-137 MHz). As the aircraft has, e.g., no AIS transponder, the respective information (identification, aircraft type, position, speed, course and other data) is not emitted.

Localization

Localization by radio direction finding and evaluating the signal strength takes place, e.g., in the same way as the localization of a fully equipped aircraft. As the airplane or helicopter emits no ADS-B data, there is a probability that the object is not within the determined probability zone or the detection probability of other aircrafts is rated as being too low to determine a unique GPS position. In comparison, localizing the aircrafts without transponders is less accurate. Further, there is even a potential of faulty detection when a fully equipped aircraft whose emitted GPS position is rated as being highly probable is within the determined probability zone.

Identification

In this scenario, identification is, e.g., not necessarily possible in an automated manner. It can be assumed that a radio signal originates from an aircraft not needing to have ADS-B equipment or where the transponder system is defect or switched off.

In usage on land, e.g., rescue services and disaster control, stationary or mobile (vehicles) mission controls are provided with the apparatus 100, in particular with transcription unit 120, object determination unit 130 as well as object localization unit 140 (e.g., radio direction finder) in order to trace radio messages (e.g., a voice radio signal 110) from deployed (in service) units. Thereby, assessment of the situation and documentation of the situation in mission control could be ensured analogously in the field of usage in the maritime sector and aviation sector.

The effect of the apparatus 100 for automated transcription of the voice radio signal 110 and for simultaneous identification of the sender as well as its localization is making the communication in radio more secure. The communication participants (e.g., the object 200) are supported in that they clearly understand what has been spoken (speech recognition), who has spoken (identification) and where the object is located (locating/localization). By the technology, the traceability of the complex communication structure in the maritime sector, air traffic as well as further fields of application is to be increased. An automated transcription system (e.g., transcription unit 120) putting the received radio communication in writing locally and independent of the speaker and storing the same supplemented by a linked transmitter detection serves mainly to support and relieve coastal radio stations, maritime search and rescue organizations, public authorities as well as a ship's crew in fulfilling their tasks. Further, the usage supports nautical training when using ship guiding simulators. In aviation, the system serves to increase the security of communication and ease the work of air traffic controllers, among others. Similar advantages can be identified for further fields of application.

Maritime Applications:

Rescue organizations, such as DGzRS (German Maritime Search and Rescue Service) or also the Havariekommando (Central Command for Maritime Emergencies) would heavily profit from secure communication during rescue operations. By identifying, position determining as well as tracing the identification, position determination as well as tracing of the emergency call of a damaged ship, rescue operations can be organized faster and more effectively.

Water police, coastguard, VTS (vessel traffic service) service providers and other organizations where the function monitoring represents an essential aspect of their work could also use the presented technology also in an advantageous manner.

In the apparatus 100 described herein, the focus can also be placed on integratability of the technology into existing systems. Possible manufacturers of ECDIS (electronic charge display and information system) should be able to integrate the apparatus 100 by a standardized protocol.

Application in Aviation:

A possible usage scenario is monitoring the coastlines from the air. By using an aviation-compatible direction finding system, the technology (the apparatus 100) can also be integrated in a helicopter. By the respective flight altitude and speed of a helicopter, communication monitoring at sea is enabled for a significantly greater area. Manufacturers of helicopter glass cockpits should also be able to integrate this application.

Further Applications:

Support of search and rescue organizations inland, such as when monitoring coastal waters or when organizing rescue operations at land, for example when coordinating police operations, emergency doctor operations, fire rescue operations or operations of non-profit organizations, such as mountain rescue.

Figure 2:
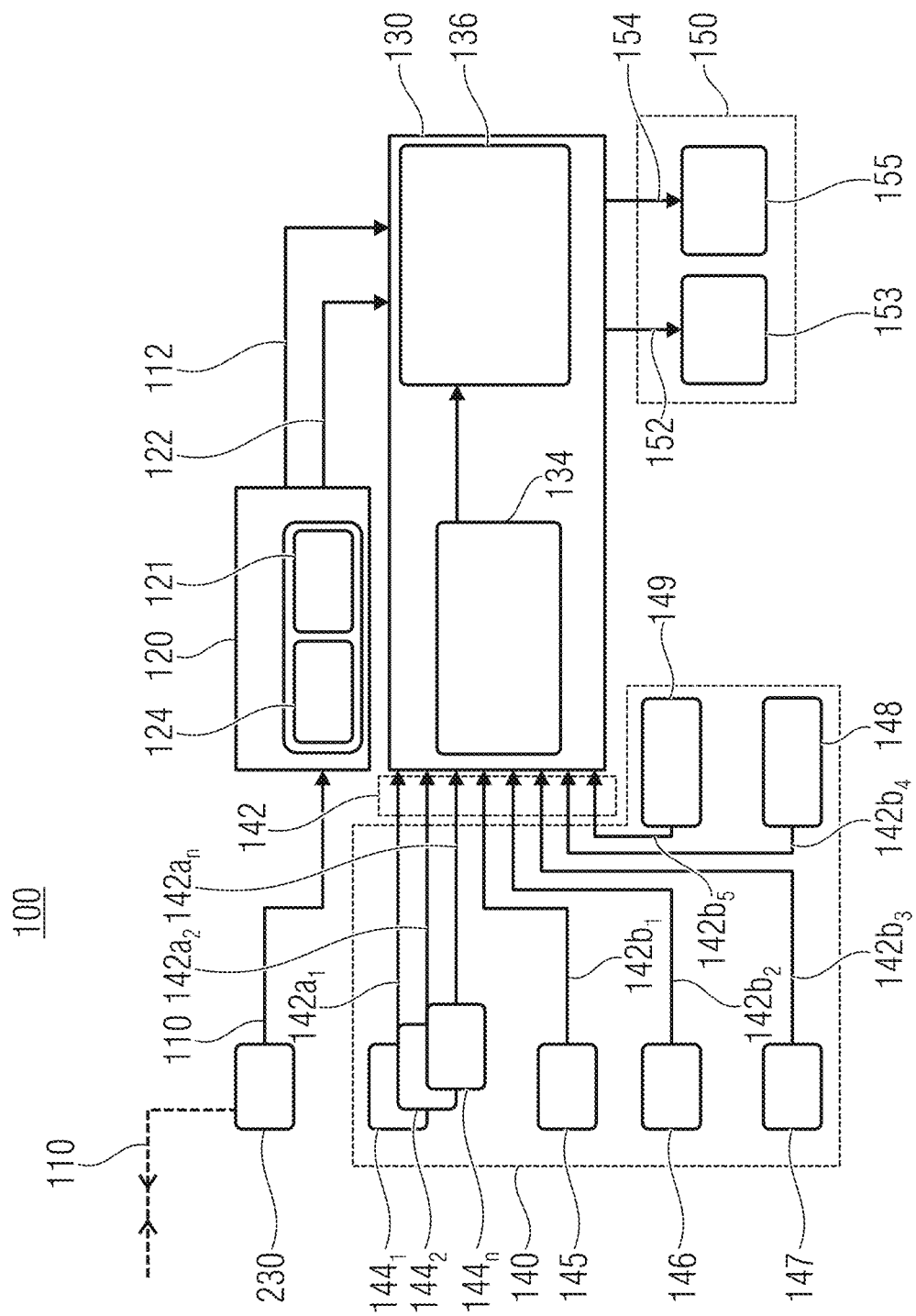
FIG. 2 is a schematic block diagram of an apparatus according to an embodiment of the present invention.

FIG. 2 shows a block diagram of an apparatus 100 according to an embodiment of the present invention. The apparatus 100 is configured to receive a voice radio signal 110 that can represent a voice signal (e.g., analog or digital) by means of a radio device 230 (receiver). Thus, the voice radio signal 110 can be emitted by an object and can be received by the radio device 230. Optionally, the apparatus 100 can comprise the radio device 230, wherein the apparatus 100 can thus also be configured to emit a voice radio signal 110 with the radio device 230 and simultaneously further process the actually emitted voice radio signal 110 by means of the apparatus 100. According to an embodiment, the radio device 230 can be any radio device or any voice signal source (aviation radio band for aviation radio, maritime radio band for maritime radio and/or emergency services radio for land radio).

According to an embodiment, the voice radio signal 110 can be transmitted to a transcription unit 120 of the apparatus 100 by a radio device receiver of the radio device 230, such that the apparatus 100 can process the voice radio signal 110. The transcription unit 120 can be considered as automated transcription system of radio messages, wherein the transcription unit 120 is configured to convert the voice radio signal 110 into a text signal 112. For this, the transcription unit 120 can comprise speech recognition 124 that can convert the voice radio signal 110 into the text signal 112 (for example into a message in text form (e.g., ASCII)).

Further, the transcription unit 120 can comprise, for example, speech pattern identification 121, whereby the transcription unit 120 can be configured to extract a speech pattern code 122 from the voice radio signal 110 and provide the same to an object determination unit 130 of the apparatus 100. The speech pattern code 122 can form a unique ID allocated to the radio message pattern by which an object from which the voice radio signal 110 originates can be identified. Identification by means of speech pattern code can be performed by the object determination unit 130.

According to an embodiment, the transcription unit 120 is configured to use a neuronal network to convert the voice radio signal 110 into the text signal 112.

According to an embodiment, the apparatus 100 comprises an object localization unit 140 configured to determine position information 142 of the object from which the voice radio signal 110 originates. According to an embodiment, the object localization unit 140 can comprise at least one radio direction finder $144_1$ to $144_n$ (e.g., part of a localization apparatus) or can be configured to communicate with the at least one radio direction finder $144_1$ to $144_n$ to determine direction finding data $142a_1$ to $142a_n$ as position information 142. Thus, the object localization unit 140 can comprise n radio direction finders $144_1$ to $144_n$ or can be configured to communicate with n radio direction finders $144_1$ to $144_n$, wherein n represents a positive integer number. Thus, the object localization unit 140 can perform direction determinations of a radio signal, e.g., the voice radio signal 110 by means of the radio direction finders $144_1$ to $144_n$, wherein usage of several direction finders $144_1$ to $144_n$ allows position determination of the radio source. If only one radio direction finder is used, for example, only a coarse area where the radio source (the object) is arranged can be determined as position information 142. If, however, several direction finders $144_1$ to $144n$ exist and are used, a very exact position of the radio source can be determined by means of the object localization unit 140, for example, by means of cross bearing.

According to an embodiment, the object localization unit 140 can further comprise a GPS receiver 144, an ADS-B receiver 146, an AIS receiver 147, a general position data receiver 148 and/or a compass 149 or can be configured to communicate with the same to receive the position data, such as GPS data $142b_1$, ADS-B data $142b_2$, AIS data $142b_3$ and/or further other general position data $142b_4$ and $142b_5$. The position data $142b_1$ to $142b_5$ can comprise positions of objects located within an area where the apparatus 100 has determined an origin of the voice radio signal 110 with a specific probability. This area can result, for example, from the direction finding data $142a_1$ to $142a_n$. According to an embodiment, together with the position data $142b_1$ to $142b_5$, the direction finding data $142a_1$ to $142a_n$ can form the position information 142 determined by the object localization unit 140. Optionally, the objection localization unit 140 can further comprise a radar unit or can be configured to communicate with the same to receive further or alternative position data.

According to an embodiment, the GPS receiver 145 can be configured to determine the own position of the apparatus 100. For this, additionally or alternatively, the compass 149 can be used, wherein the same can determine its own heading, e.g., of the object where the apparatus 100 is arranged. Determining the own position or own heading is advantageous in that the position of objects from which the voice radio signal 110 originates can be determined very quickly, efficiently and in relation to the position or orientation of the apparatus 100 or the object with the apparatus 100.

According to an embodiment, the ADS-B receiver 146 can be configured to perform position determination of ADS-B emitting objects, such as a position of aircrafts in the environment.

According to an embodiment, the AIS receiver 147 can be configured to perform position determination of an AIS emitting objects, such as a position of ships in the environment. According to an embodiment, the general position data receiver 148 can be configured to perform position determination and identification of any objects, such as land vehicles. Thus, the object localization unit 140 enables localizing most diverse objects, such as ships, airplanes and/or land vehicles.

According to an embodiment, the position data $142b_1$ to $142b_5$ can be GPS positions, a route, a speed and/or an altitude relative to sea level.

Further, the apparatus 100 comprises the object determination unit 130 configured to determine an object from which the voice radio signal 110 originates. According to an embodiment, the object determination unit 130 can also be referred to as automatic object identification with position determination. According to an embodiment, the object determination unit 130 receives the text signal 112 and/or the speech pattern code 120 from the transcription unit 120 and the position information 142 that can include an area from which the voice radio signal originates as direction finding data $142a_1$ to $142a_n$ and can include position data $142b_1$ to $142b_5$ from the object localization unit 140.

According to an embodiment, the object determination unit 130 can be divided into two processing units. The first processing unit 134 can be configured to perform general object recognition, such as ship recognition, aircraft recognition and/or land vehicle recognition. Thus, the first processing unit 134 can process, for example, the position information 142. For this, the object determination 130 can be configured to compare the position data $142b_1$ to $142b_5$ of the position information 142 with the direction finding data $142a_1$ to $142a_n$ of the position information 142 to determine objects from which the voice radio signal 110 originates with a specific detection probability (which can be determined by the object determination unit 130). The position information 142 comprises, for example, a position or an area (e.g., the direction finding data $142a_1$ to $142a_n$) from which the voice radio signal 110 originates and general position data $142b_1$ to $142b_5$, which can comprise positions of all objects in an environment of the apparatus 100. Thus, the object determination unit 130 can be configured to determine a match between the position data $142b_1$ to $142b_5$ and the direction finding data $142a_1$ to $142a_n$ and to allocate a detection probability to the objects determined in that manner, wherein the detection probability depend on the match. In other words, the first processing unit 134 performs, for example, identification and position determination of objects (ships, aircrafts or land vehicles) that transmit a radio signal 110 with a detection probability.

According to an embodiment, the detection probability can define a degree of correspondence of the determined position information $142a_1$ to $142a_n$ with an actual position $142b_1$ to $142b_4$ of an object. Further or alternatively, the object determination unit 130 can be configured to determine the detection probability based on probabilities of correct position information 142 of the object localization unit 140, wherein correct can mean that the position data receivers 145, 146, 147, 148, 149 comprise an inaccuracy in determining the position data $142b_1$, to $142b_5$ that is less than a lower limit.

According to an embodiment, the objects detected in that way (e.g., water vehicles, aircraft or land vehicles) are transmitted, together with the detection probability, the position, the course and/or further data, by the first processing unit 134 to a second processing unit 136 of the object determination unit 130. According to an embodiment, the object determination unit 130 can be configured, e.g., by means of the second processing unit 136, to apply an algorithm for object data rendering to the detected objects (e.g., by means of the first processing unit 134). By means of the algorithm, on the one hand, all air, water and land vehicles can be combined and, on the other hand, information on the vehicles (position, course, etc.), radio message text 112, speech pattern code 122, direction finding, etc., can be merged into one or several objects. In that way, the object determination unit 130 can be configured, for example, to determine the object having the highest detection probability as the object from which the voice radio signal 110 originates and hence reduce all detected objects to one object. According to an embodiment, the object determination unit 130 is configured to determine an object identification of the object from the text signal 112 and hence reduce the detected objects to this one object. According to an embodiment, the object determination unit can be configured to determine the object based on the speech pattern code 122 from which the voice radio signal originates and hence reduce the detected object to this one object.

According to an embodiment, the object determination unit 130 can merge the data of several objects when several voice radio signals 110 are processed simultaneously by the apparatus 100 or when the algorithm for object data rendering determines several objects that are considered for emitting the voice radio signal 110.

Further, the apparatus 100 comprises an output unit 150 configured to allocate the text signal 112 to the object and to provide the same. According to an embodiment, the output unit 150 can comprise an interface 152 for a data protocol and/or an internal graphical interface 154. By means of the interface 152, the data (e.g., text signal together with object identification and position and time) determined by the apparatus 100 can be transmitted to an external device or external software to provide the data for a user of the apparatus 100. In that way, the data can, for example, be transmitted to ECDIS 153 and hence be illustrated in electronic nautical chart. According to an embodiment, the data are illustrated on a monitor 155 comprised by the apparatus 100 via the internal graphical interface 154.

According to an embodiment, the output unit 150 can be configured to allocate at least two text signals 112 of at least two voice radio signals 110 to the respective object and to provide the same chronologically via a user interface of the apparatus (for example, the monitor 155) and/or to store the same in a database (for example, via the interface 152).

In other words, FIG. 2 shows an apparatus system and method automatically putting into writing voice messages (e.g., the voice radio signal 110) transmitted via VHF maritime radio or aviation radio, i.e., illustrating the same and optionally ensuring reliable sender allocation of each received voice message by linking different information and communication technologies on board (AIS, ADS-B, GPS as well as radio direction finding systems). FIG. 2 illustrates the system design as a block diagram.

According to an embodiment, the system (e.g., the apparatus 100) consists of one or several computer systems and, e.g., further data sources that are processed as input data. As output (e.g., output unit 150), the system has an internal graphical interface 154 suitable for illustrating voice messages (e.g., the voice radio signal 110 as text signal 112) and identified objects on any monitor 155. Further, the system provides a data protocol interface 152 (e.g., NMEA) that can be processed by other information systems (e.g., ECDIS-electronic chart display information system 153) (see FIG. 2).

The following data or signals are processed as input, for example (wherein any combinations are possible):

a) Voice Signal (e.g., the voice radio signal 110)—The voice signal is, e.g., an analog or digital signal that represents a received radio message and that can be provided by any radio device 230 or an interposed signal digitalization.

b) Direction Finding Data $142a_1$-$142a_n$ (direction finder 1 to n $144_1$-$144_n$)—The signals $142a_1$-$142a_n$ represent the direction finding data that are connected to the system via, e.g., any protocol. The data $142a_1$-$142a_n$ include, for example, direction finding, signal strength, adjusted frequency and other data.

c) GPS Data $142b_1$—The GPS data $142b_1$ are important, e.g., for determining the own position (e.g., own watercraft, aircraft, land vehicle, direction finding station of the maritime traffic center, direction finding station of an airport). Further, optionally, data such as the UTC time and variations at the current position are needed.

d) ADS-B Data $142b_2$—ADS-B data $142b_2$ are normally obtained by an ADS-B receiver 146. The same include, e.g., all relevant data of an aircraft, such as aircraft identification, position above ground, altitude, speeds, course and further data.

e) AIS Data $142b_3$—Analog to the ADS-B data $142b_2$, the AIS data $142b_3$ represent the position information of watercrafts and are received, e.g., by means of an AIS receiver 147. The data $142b_3$ include, e.g., also the ship identification, position, speed, course and other data.

f) General Position Data Receiver 148—The system should also be able to process any data protocol by an extension. It is also possible to develop proprietary position determination and protocol systems extending the application of the system to other fields of application (for example land, mountains, etc.).

g) Compass 149—The system optionally needs compass data for determining the orientation of the own object (e.g., own watercraft, aircraft, land vehicle, direction finding station of the maritime traffic center, direction finding station of an airport). Normally, the compass data $142b_5$ are allocated to the orientation of the direction finding antenna. Accordingly, e.g., respective compass information are needed per direction finding antenna. For stationary direction finding antennas, the orientation can be entered directly into the system.

According to an embodiment, processing is performed in three steps. The analog or digital radio message (e.g., the voice radio signal 110) is first converted into e.g., an ASCII text message 112, by means of an automatic transcription system 120. In parallel, for example, the sender is subject to direction finding by one or several direction finding systems $144_1$-$144_n$. By the algorithm for automatic object identification (e.g., by means of the object determination unit 130) and position determination, e.g., the sender (e.g., the object) of the radio message is identified and its position is determined. For the detected objects, e.g., a respective detection or identification probability is indicated. Finally, the text message 112 of the radio message 110 is allocated to the respective object.

Detected objects and messages 112 are output as output (e.g., output unit 150). The following options exist:
  a) Interface Data Protocol 152—The interface can be any defined interface or protocol allowing integration of the system in other systems.
  b) Internal Graphical Interface 154—The system can also include an own proprietary graphic illustration of determined data (own graphical illustration on a monitor/output location 155).

Figure 3:
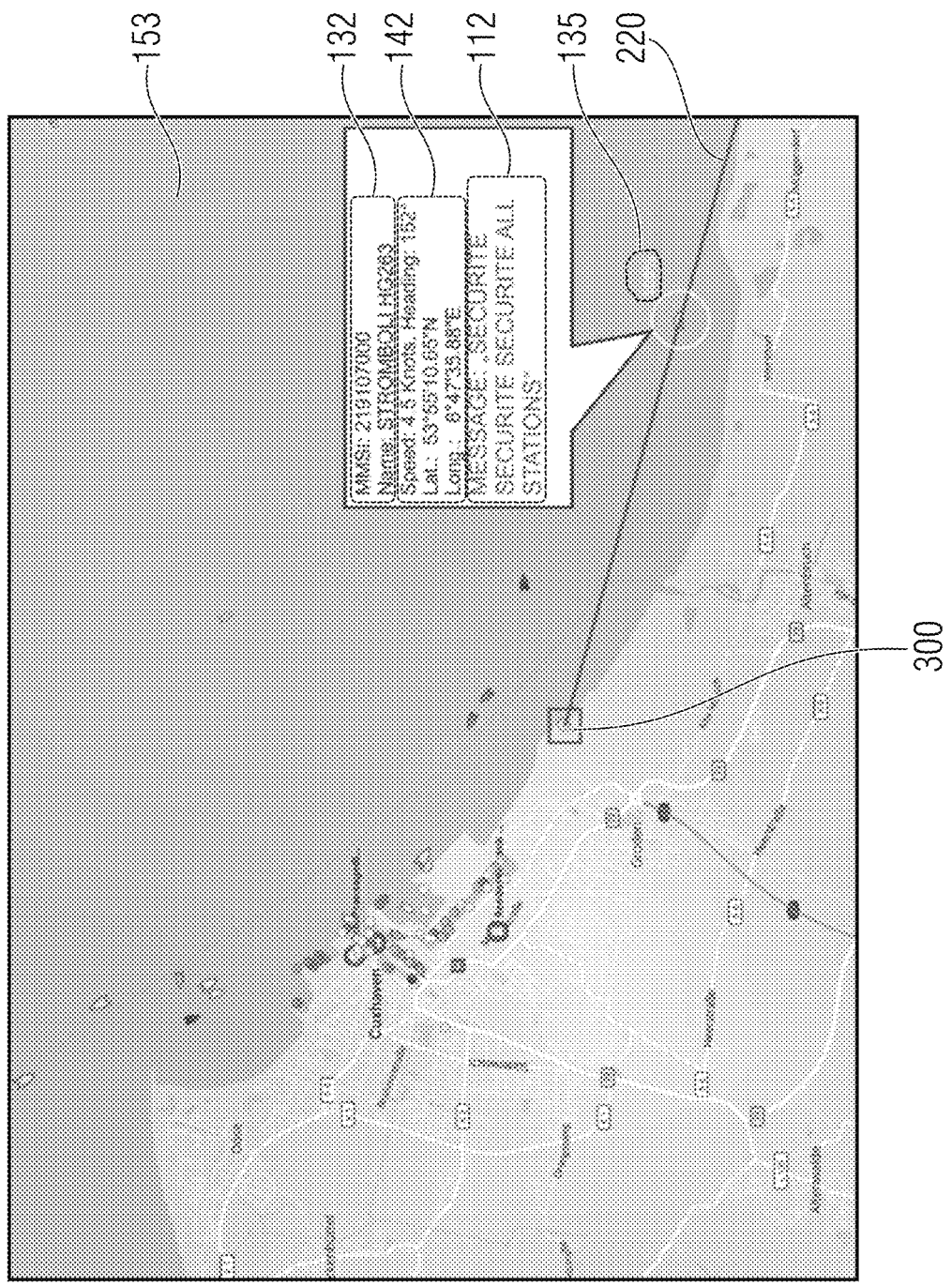
FIG. 3 is a schematic illustration of a graphic provision of a text signal allocated to an object by means of the output unit according to an embodiment of the present invention.
Figure 4:
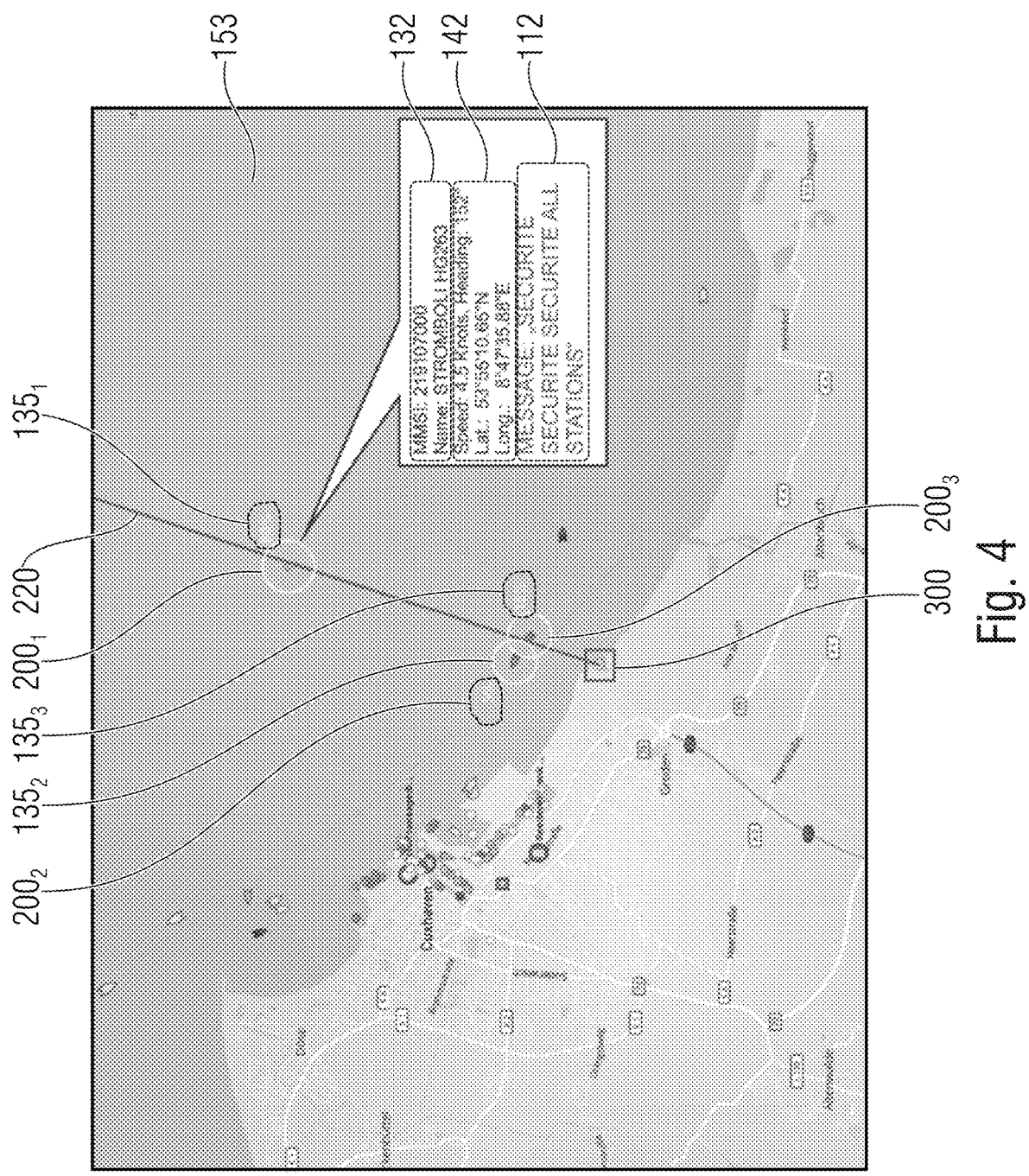
FIG. 4 is a schematic illustration of a graphic provision of a text signal allocated to an object with a highest detection probability by means of the output unit according to an embodiment of the present invention.
Figure 5:
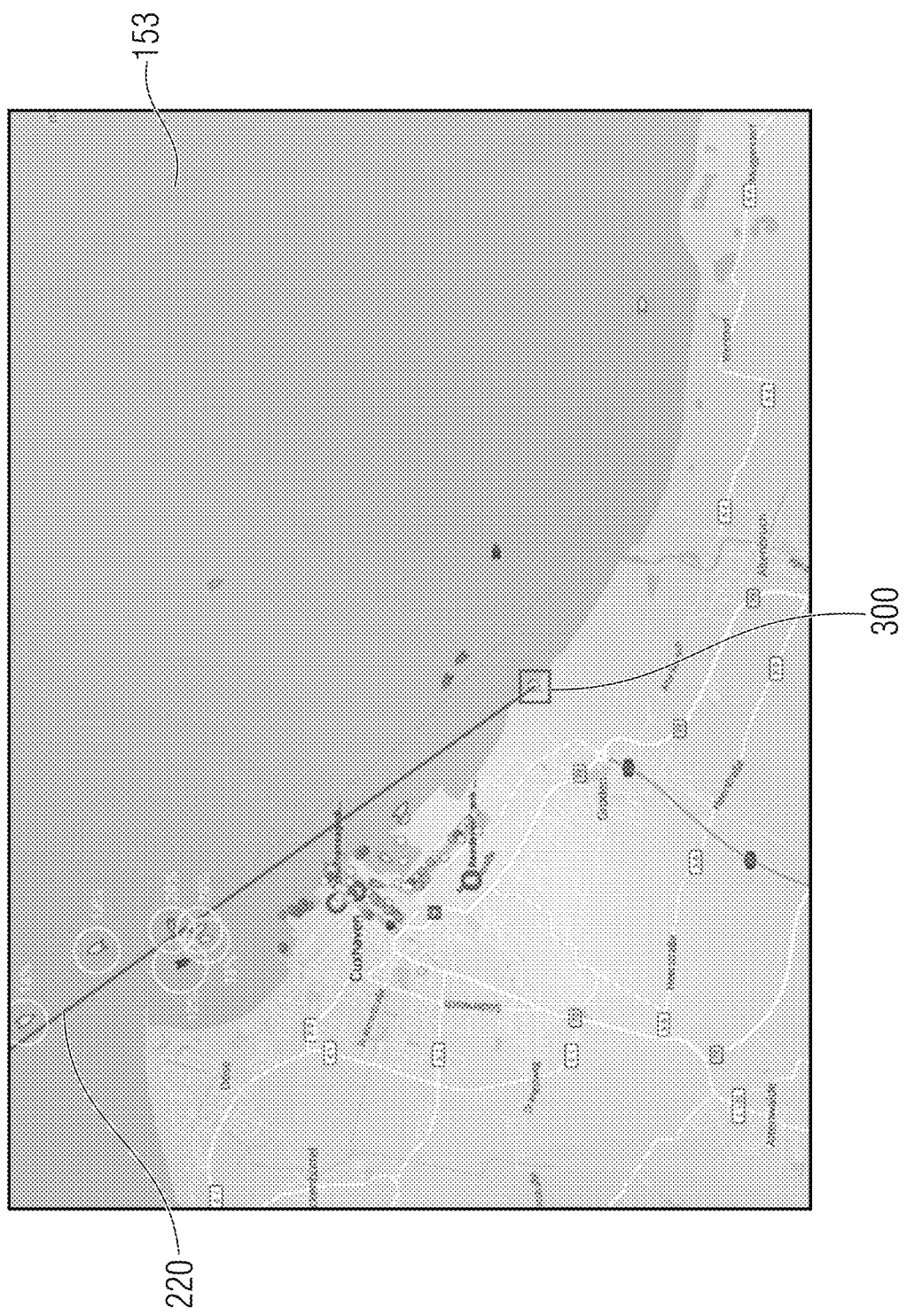
FIG. 5 is a schematic illustration of a non-unique identification of an object from which the voice radio signal originates by means of an apparatus according to an embodiment of the present invention.

The following FIGS. 3 to 5 represent a possible illustration of the graphical interface 154 based on a maritime application. Other applications, e.g., in aviation or other fields of application, would follow the same logic.

FIG. 3 shows a graphic illustration of a transcribed radio message 112 (e.g., text signal) of a watercraft identified as sender (100% identification probability 135 (e.g., detection probability)) in an electronic nautical chart 153 according to an embodiment of the present invention. Further, an object or object identification 132 and optionally position information 142 are allocated to the radio message 112.

FIG. 4 shows a graphic illustration of a transcribed radio message 112 (e.g., text signal) with three possible watercrafts (e.g., objects $200_1$ to $200_3$) in an electronic nautical chart 153, wherein the transcribed radio message 112 is allocated to the object $200_1$ with object identification 132 and position information 142 having a highest identification probability $135_1$ of 80% (detection probability). For each of the detected objects $200_1$ to $200_3$, the inventive apparatus can determine an identification probability $135_1$ to $135_3$ and allocate the same to the respective object.

FIG. 5 shows a graphic illustration of an electronic nautical chart 153 when an identification of a sender cannot be determined clearly by means of the apparatus.

According to an embodiment, the inventive apparatus 100 can be arranged in a land station 300. By means of a radio direction finder, the apparatus can be configured to determine an area 220 where the object from which the voice radio signal originates is arranged with a probability 135, $135_1$ to $135_3$. According to the embodiments in FIGS. 3 to 5, the area 220 can be a signal-beam determined by means of a radio direction finder.

Figure 6:
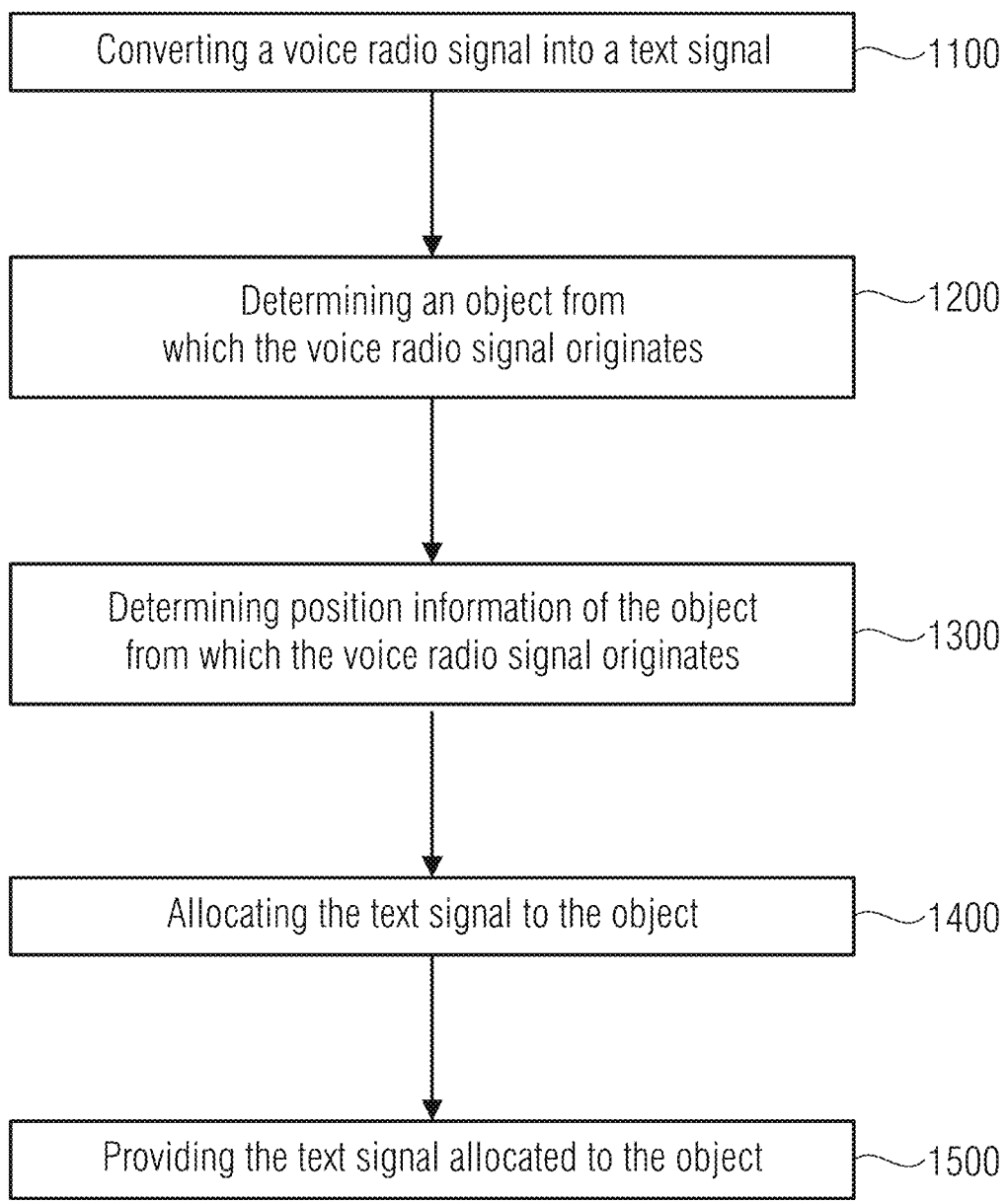
FIG. 6 is a block diagram of a method for processing a voice radio signal according to an embodiment of the present invention.

FIG. 6 shows a block diagram of a method 1000 for processing a voice radio signal, wherein the method comprises conversion 1100 of the voice radio signal into a text signal by means of a transcription unit. Further, the method 1000 comprises determination 1200 of an object from which the voice radio signal originates by means of an object determination unit. Further, the method 1000 comprises determination 1300 of position information of the object from which the voice radio signal originates by means of an object localization unit, allocation 1400 of the text signal to the object and provision 1500 of the text signal allocated to the object by means of an output unit.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example.

The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein may be implemented, for example, by using a hardware apparatus or by using a computer or by using a combination of a hardware apparatus and a computer.

The apparatuses described herein or any components of the apparatuses described herein may be implemented at least partly in hardware and/or software (computer program).

The methods described herein may be implemented, for example, by using a hardware apparatus or by using a computer or by using a combination of a hardware apparatus and a computer.

The methods described herein or any components of the methods described herein may be performed at least partly by hardware and/or by software (computer program).

Further embodiments of the present invention will now be described.

A first embodiment provides an apparatus (100) for processing a voice radio signal (110), comprising:
- a transcription unit (120) configured to convert the voice radio signal (110) into a text signal (112);
- an object determination unit (130) configured to determine an object (200) from which the voice radio signal (110) originates;
- an object localization unit (140) configured to determine position information (142) of the object (200) from which the voice radio signal (110) originates; and
- an output unit (150) configured to allocate the text signal (112) to the object (200) and to provide the same.

A second embodiment provides an apparatus (100) according to the first embodiment, wherein the object localization unit (140) is configured to determine an area (220) where the object is arranged with a probability (200) as position information (142) and wherein the object localization unit (140) comprises at least one localization apparatus or is configured to communicate with the at least one localization apparatus to determine a source of the voice radio signal as the area (220).

A third embodiment provides an apparatus (100) according to the second embodiment, wherein the localization apparatus includes at least one radio direction finder ($144_1$ to $144_n$).

A fourth embodiment provides an apparatus (100) according to one of the first to third embodiments, wherein the object localization unit (140) is further configured to receive position data ($142b_1$ to $142b_5$) of objects (200).

A fifth embodiment provides an apparatus (100) according to the fourth embodiment, wherein the object localization unit (140) comprises an AIS receiver (147), an ADS-B receiver (146), a radar unit and/or a general position data receiver (148) or is configured to communicate with the same in order to receive the position data ($142b_1$ to $142b_5$) and wherein the position data ($142b_1$ to $142b_5$) comprise a GPS position, a route, a speed and/or an altitude relative to sea level.

A sixth embodiment provides an apparatus (100) according to one of the first to fifth embodiments, wherein the object determination unit (130) comprises an AIS receiver (147), an ADS-B receiver (146) and/or a general object identification receiver or is configured to communicate with the same to obtain object identification data (132) of at least one object (200) whose position (210) at least partly matches the position information (142) determined by the object localization unit (140).

A seventh embodiment provides an apparatus (100) according to the sixth embodiment, wherein the object identification data (132) comprise a call number of the maritime mobile service (MMSI), an object name, a target of the object (200), a load of the object (200) and/or a size of the object (200).

An eighth embodiment provides an apparatus (100) according to one of the first to seventh embodiments, wherein the object determination unit (130) is configured to determine a detection probability (135, $135_1$ to $135_3$) for at least one object (200) whose position (210) at least partly matches the determined position information (142), and
wherein the object determination unit (130) is configured to determine the object (200) with the highest detection probability (135, $135_1$ to $135_3$) as the object (200) from which the voice radio signal (110) originates.

A ninth embodiment provides an apparatus (100) according to the eighth embodiment, wherein the detection probability (135, $135_1$ to $135_3$) defines a degree of correspondence of the determined position information (142) with an actual position (210) of an object (200) and/or
wherein the object determination unit (130) is configured to determine the detection probability (135, $135_1$ to $135_3$) based on probabilities of a correct position information (142) of the object localization unit (140).

A tenth embodiment provides an apparatus (100) according to one of the first to ninth embodiments, wherein the object determination unit (130) is configured to communicate with the transcription unit (120) to determine object identification data (132) of the object (200) from the text signal (112).

An eleventh embodiment provides an apparatus (100) according to one of the first to tenth embodiments, wherein the transcription unit (120) is configured to extract a speech pattern code (122) from the voice radio signal (110) and to provide the same to the object determination unit (130),
wherein the object determination unit (130) is configured to determine the object (200) from which the voice radio signal (110) originates based on the speech pattern code (122).

A twelfth embodiment provides an apparatus (100) according to one of the first to eleventh embodiments, wherein the transcription unit (120) is configured to use a neuronal network to convert the voice radio signal (110) into a text signal (112).

A thirteenth embodiment provides an apparatus (100) according to one of the first to twelfth embodiments, wherein the apparatus (100) is configured to process at least two voice radio signals (110) simultaneously and/or offset in time, and
wherein the output unit (150) is configured to allocate at least two text signals (112) of the at least two voice radio signals (110) to the respective object (200) and to provide them chronologically to the apparatus (100) via a user interface (155) and/or to store the same in a database.

A fourteenth embodiment provides an apparatus (100) according to one of the first to thirteenth embodiments, wherein the output unit (150) is configured to provide both the text signal (112), an allocated object (200), a position (210) of the object (200) as well as an input time of the voice radio signals via a user interface (155) to the apparatus (100) and/or to store the same in a database.

A fifteenth embodiment provides an apparatus (100) according to one of the first to fourteenth embodiments, wherein the object (200) forms a ship, an airplane or a vehicle.

A sixteenth embodiment provides a method (1000) for processing a voice radio signal, the method comprising the following steps:
- converting (1100) the voice radio signal into a text signal by means of a transcription unit;
- determining (1200) an object from which the voice radio signal originates by means of an object determination unit;
- determining (1300) position information of the object from which the voice radio signal originates by means of an object localization unit; and
- allocating (1400) the text signal to the object and providing (1500) the text signal allocated to the object by means of an output unit.

A seventeenth embodiment provides a computer program with a program code for performing the method according to the sixteenth embodiment when the program runs on a computer.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for processing a voice radio signal, comprising:
   - a transcription unit configured to convert the voice radio signal into a text signal;
   - an object determination unit configured to determine an object from which the voice radio signal originates;
   - an object localization unit configured to determine position information of the object from which the voice radio signal originates, wherein the object localization unit comprises at least one radio direction finder;
   - an output unit configured to allocate the text signal to the object and to provide the same; and
   - wherein the object determination unit is configured to determine, for objects in an environment of the apparatus, a respective detection probability, wherein the respective detection probability defines a degree of correspondence of the position information, determined by means of the object localization unit, with an actual position of the respective object, determined by an AIS receiver, an ADS-B receiver and/or a radar unit, and
   - wherein the object determination unit is configured, to determine as the object from which the voice radio signal originates an object with a highest detection probability, or all objects with detection probabilities deviating from each other by not more than a predefined degree.

2. The apparatus according to claim 1, wherein the object localization unit is configured to determine as the position information an area where the object from which the voice radio signal originates is arranged.

3. The apparatus according to claim 1, wherein the object determination unit comprises the AIS receiver, and/or the ADS-B receiver or is configured to communicate with the same to acquire object identification data of at least one object whose position at least partly matches the position information determined by the object localization unit.

4. The apparatus according to claim 3, wherein the object identification data comprise a call number of the maritime mobile service, an object name, a target of the object, a load of the object and/or a size of the object.

5. The apparatus according to claim 1,
   wherein the object determination unit is further configured to determine the respective detection probability based on probabilities of correct position information of the object localization unit.

6. The apparatus according to claim 1, wherein the object determination unit is configured to communicate with the transcription unit to determine object identification data of the object from the text signal.

7. The apparatus according to claim 1, wherein the transcription unit is configured to extract a speech pattern code from the voice radio signal and to provide the same to the object determination unit,
   wherein the object determination unit is configured to determine the object from which the voice radio signal originates based on the speech pattern code.

8. The apparatus according to claim 1, wherein the transcription unit is configured to use a neuronal network to convert the voice radio signal into a text signal.

9. The apparatus according to claim 1, wherein the apparatus is configured to process at least two voice radio signals simultaneously and/or offset in time, and
   wherein the output unit is configured to allocate at least two text signals of the at least two voice radio signals to a respective object and to provide the same chronologically to a user interface of the apparatus and/or to store the same in a database.

10. The apparatus according to claim 1, wherein the output unit is configured to provide both the text signal, an allocated object, a position of the object as well as an input time of the voice radio signals to a user interface of the apparatus and/or to store the same in a database.

11. The apparatus according to claim 1, wherein the object is a ship, an airplane or a vehicle.

12. A method for processing a voice radio signal, the method comprising:
   - converting the voice radio signal into a text signal by means of a transcription unit;
   - determining an object from which the voice radio signal originates by means of an object determination unit;
   - determining position information of the object from which the voice radio signal originates by means of an object localization unit, wherein the object localization unit comprises at least one radio direction finder; and
   - allocating the text signal to the object and providing the text signal allocated to the object by means of an output unit;
   - wherein determining the object from which the voice radio signal originates comprises determining, for objects in an environment, a respective detection probability, and determining as the object from which the voice radio signal originates an object with the highest detection probability, or all objects with detection probabilities deviating from each other by not more than a predefined degree,
   - wherein the respective detection probability defines a degree of correspondence of the position information, determined by means of the object localization unit, with an actual position of the respective object, determined by an AIS receiver, an ADS-B receiver and/or a radar unit.

13. A non-transitory digital storage medium storing instructions which, when executed by a computer, cause the computer to perform steps comprising:
- converting the voice radio signal into a text signal by means of a transcription unit;
- determining an object from which the voice radio signal originates by means of an object determination unit;
- determining position information of the object from which the voice radio signal originates by means of an object localization unit, wherein the object localization unit comprises at least one radio direction finder; and
- allocating the text signal to the object and providing the text signal allocated to the object by means of an output unit;
- wherein determining the object from which the voice radio signal originates comprises determining, for objects in an environment, a respective detection probability, and determining as the object from which the voice radio signal originates an object with a highest detection probability, or all objects with detection probabilities deviating from each other by not more than a predefined degree,
- wherein the respective detection probability defines a degree of correspondence of the position information, determined by means of the object localization unit, with an actual position of the respective object, determined by an AIS receiver, an ADS-B receiver and/or a radar unit.

* * * * *